United States Patent
Zou et al.

(10) Patent No.: US 8,381,392 B2
(45) Date of Patent: Feb. 26, 2013

(54) METHOD FOR MANUFACTURING A SELF-ALIGNED BEVEL FOR A WRITE POLE

(75) Inventors: Jie Zou, Eden Prairie, MN (US); Kaizhong Gao, Eden Prairie, MN (US)

(73) Assignee: Seagate Technology LLC, Cupertino, CA (US)

( * ) Notice: Subject to any disclaimer, the term of this patent is extended or adjusted under 35 U.S.C. 154(b) by 154 days.

(21) Appl. No.: 12/777,959

(22) Filed: May 11, 2010

(65) Prior Publication Data

US 2011/0277316 A1    Nov. 17, 2011

(51) Int. Cl.
*G11B 5/127* (2006.01)
*H04R 31/00* (2006.01)

(52) U.S. Cl. ............... 29/603.16; 29/603.13; 29/603.14; 29/603.15; 29/603.18; 216/62; 216/65; 216/66; 360/121; 360/122; 360/317; 451/5; 451/41

(58) Field of Classification Search ............... 29/603.07, 29/603.13–603.16, 603.18; 216/62, 65, 66; 360/122, 125.12, 126, 317, 324–327; 451/5, 451/41

See application file for complete search history.

(56) References Cited

U.S. PATENT DOCUMENTS

| 7,159,302 | B2 | 1/2007 | Feldbaum et al. | |
| 7,251,878 | B2 | 8/2007 | Le et al. | |
| 7,477,481 | B2 | 1/2009 | Guthrie et al. | |
| 7,506,428 | B2 * | 3/2009 | Bedell et al. | 29/603.12 |
| 7,716,813 | B2 * | 5/2010 | Lee et al. | 29/603.12 |
| 2007/0177301 | A1 | 8/2007 | Han et al. | |
| 2008/0316644 | A1 * | 12/2008 | Lee et al. | 360/110 |
| 2009/0168242 | A1 * | 7/2009 | Liu | 360/125.12 |
| 2009/0273863 | A1 | 11/2009 | Kawano et al. | |

\* cited by examiner

*Primary Examiner* — Paul D Kim
(74) *Attorney, Agent, or Firm* — Alan G. Rego; Westman, Champlin & Kelly, P.A.

(57) ABSTRACT

A method, including depositing a layer of material onto a base portion of a wafer, is disclosed. The layer of material has a first surface adjacent the base portion. The method also includes depositing a pattern of masking material onto a portion of a second surface of the layer. Material from the layer of material that is unprotected by the pattern of masking material is removed from the layer of material. By removing such material a portion of the layer of material is suspended from the base portion.

11 Claims, 10 Drawing Sheets

METHOD FOR MANUFACTURING A SELF-ALIGNED BEVEL FOR A WRITE POLE

BACKGROUND

Data storage systems such as disc drives typically include one or more storage discs that are rotated by a spindle motor. The surface of each of the one or more storage discs is divided into a series of data tracks. The data tracks are spaced radially from one another across a band having an inner diameter and an outer diameter. The data tracks extend generally circumferentially around the disc and can store data in the form of magnetic transitions within the radial extent of a given track. An interactive element, such as a magnetic transducer, is used to sense the magnetic transitions to read data from the given track. In addition, the interactive element can transmit an electric signal that causes a magnetic transition on the disc surface to write data to the given track.

The interactive element is mounted to an arm of an actuator. The interactive element is then selectively positioned by the actuator arm over a given data track of the disc to either read data from or write data to the given data track of the disc, as the disc rotates adjacent the transducer. The interactive element is positioned so that it hovers over the disc, supported by a volume of air between the interactive element and the disc.

As the areal density of a storage device increases, the width of each data track decreases, thereby allowing for more data tracks on the same overall area. Correspondingly, interactive elements that could formerly be positioned over a single data track when the data tracks were wider are now no longer capable of being positioned over a single data track without extending into area over neighboring tracks. In such cases, adjacent track interference may occur.

SUMMARY

In one illustrative embodiment, a method is discussed. The method includes depositing a layer of material onto a base portion of a wafer with a first surface of the layer adjacent to the base portion. The method further includes depositing a pattern of masking material onto a portion of a second surface of the layer and removing material from the layer of material unprotected by the pattern of masking material. A portion of the material removed is the first surface to cause a portion of the layer of material to be suspended from the base portion.

In another embodiment, a method is discussed. The method includes applying an electrically conductive layer of material onto a base portion of a wafer and removing a portion of the electrically conductive layer directly adjacent to the base portion so that a portion of the electrically conductive layer is suspended above the base portion.

These and other features and benefits that characterize embodiments of the present invention will be apparent upon reading the following detailed description and review of the associated drawings.

DETAILED DESCRIPTION OF ILLUSTRATIVE EMBODIMENTS

Embodiments of the present discussion provided below refer to elements fabricated from layers of thin film material applied to a substrate. One type of element discussed below that advantageously employs elements fabricated from layers of thin film material includes transducers of a read/write head that interact with a data storage device. One skilled in the art recognize that the embodiments may also be applied to other types of elements, including, for example, a sensor, a magnetic stack, integrated circuits, or other types of transducers and interactive elements.

Figure 1:
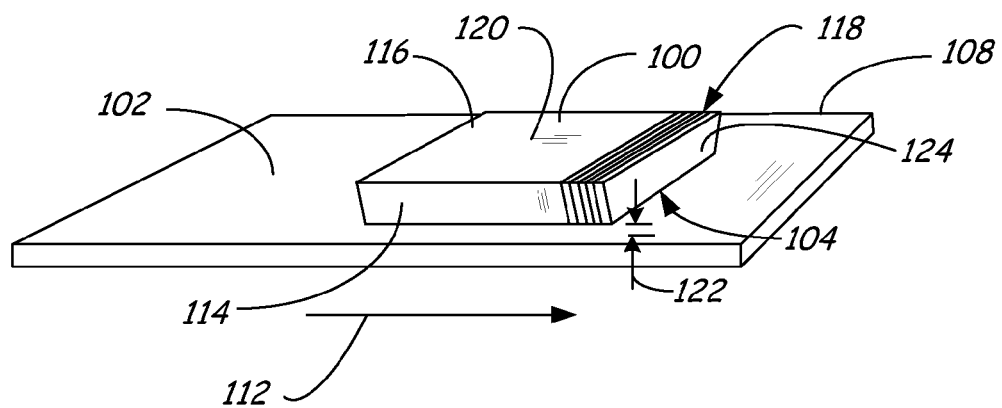
FIG. 1 is a schematic diagram providing a perspective illustration of an interactive element positioned relative to a disc drive according to one illustrative embodiment.

FIG. 1 provides a schematic representation of an interactive element 100 in close proximity to a portion of a surface 102 of a storage device 108. In some embodiments, the interactive element 100 is attached to an actuator arm (not shown in FIG. 1), which positions the interactive element 100 proximal to a selected data track on the storage device 108. The interactive element 100 is capable of reading/writing data from/to the data storage device 108.

The interactive element 100 illustratively includes a substrate 116, upon which a plurality of layers 118 are applied in a stack on the substrate 116 such as along the trailing edge of the substrate relative to the direction of the rotation of storage device 108, illustrated by arrow 112. In some embodiments, the plurality of layers 118 include write poles and/or read poles for writing information to and reading information from the storage device 108, respectively. The interactive element 100 is not drawn to scale, but shows the thickness of the layers 118 enlarged for illustrative purposes only. The actual thickness of the substrate and each of the layers of an interactive element can vary. In addition, the substrate in some embodiments is a substantially larger proportion of the overall thickness of the interactive element than is shown in FIG. 1. In addition, it should be appreciated that an interactive element can include more layers than are illustrated in FIG. 1.

The interactive element 100 has a first surface 120, which is generally positioned adjacent an actuator arm and a second surface 104, which opposes the first surface 120. The second surface 104 is positioned generally proximal to the surface 102 of storage device 108, separated only by a gap 122. The second surface 104 is known as an air bearing surface because the nature of the way the rotation of the storage device 108 creates an air pressure which acts against the actuator arm 100 to maintain the gap 122 between the interactive element 100 and surface 102. Thus, the second surface is referred to as the air-bearing surface 104 through the remainder of the discussion. The interactive element has a trailing surface 124, which corresponds to a top of the plurality of layers 118 as they are applied onto the substrate 116.

Figure 2:
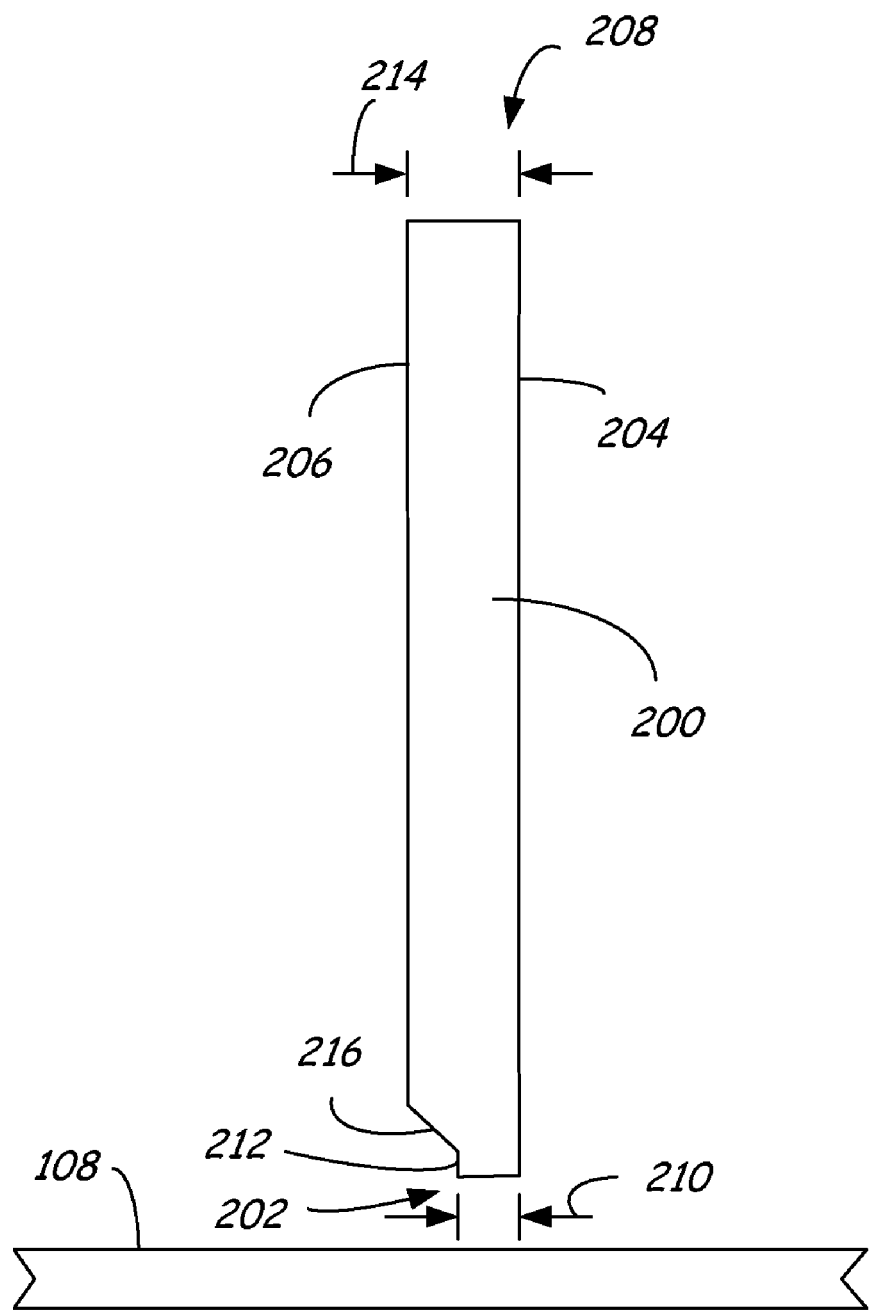
FIG. 2 illustrates a side view of a write pole of an interactive element of the type illustrated in FIG. 1 having a beveled side according to one illustrative embodiment.

FIG. 2 illustrates a side view of a write pole 200 according to one illustrative embodiment. The write pole 200 includes a proximal end 202, which faces a surface 102 of storage device 108 and may form part of the air-bearing surface 104 of the interactive element 100. For the purposes of this discussion, the write pole 200 has a top surface 204 and a bottom surface 206, which correspond to its orientation within a stack of layers. The use of the term height in this discussion describes the distance between the top surface 204 and the bottom surface 206 at any given point along the write pole 200. The write pole 200 also includes a distal end 208, which is opposite the proximal end 202. At the proximal end 202 of the write pole 200, the portion of the write pole 200 that is intended to be exposed along the air-bearing surface 104 has a height that is known as the top pole height 210. The write pole 200 has a height that is generally equal to the top pole height 210 as the write pole 200 extends away from the proximal end 202 or, put another way, extends behind the air-bearing surface 104 until a break point 212. At the break point 212, the height of the write pole 200 increases as the bottom surface 206 tapers away from the top surface 204 until the write pole 200 reaches an overall height 214. Thus, the bottom surface 206 of the write pole has a beveled portion 216 positioned behind, or away, from the air-bearing surface 104. It has been found that shaping a write pole 200 with a bevel such as bevel 216 located behind the air-bearing surface provides additional magnetic field by increasing the height of most of the write pole 200 as compared to a write pole without a bevel. In addition, by having a narrowed portion near the air-bearing surface 104, the magnetic field is focused sufficiently so as to avoid adjacent track interference. It has been found that it is advantageous for the bevel 216 to be positioned precisely so as to focus the magnetic field provided by the write pole in a desired location, that is, within a track over which the interactive element is positioned.

Figure 3:
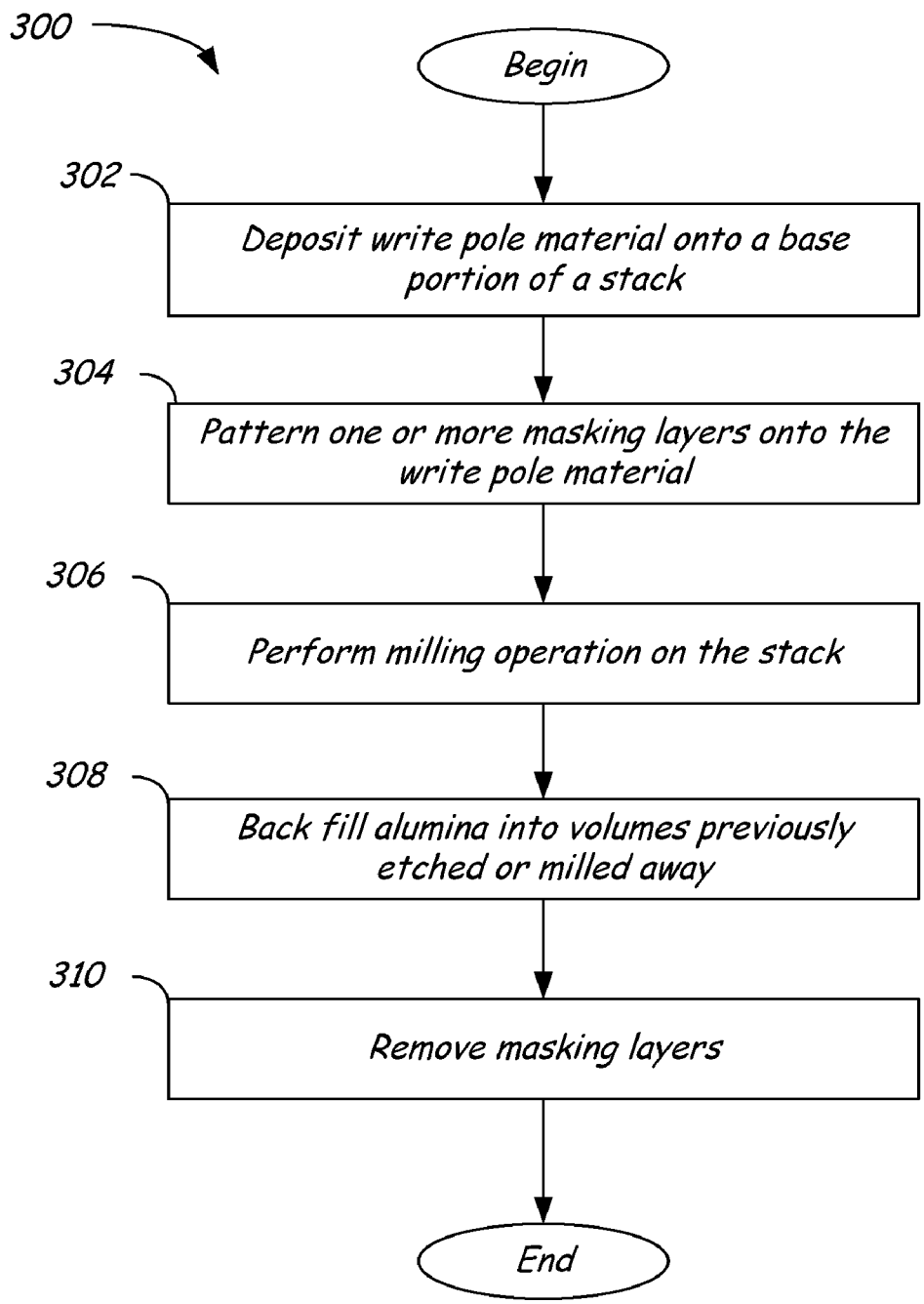
FIG. 3 illustrates a method of creating a portion of a wafer from which interface elements can be manufactured according to one illustrative embodiment.

The interactive elements discussed above are advantageously manufactured by applying layers of material onto a wafer and then milling the wafer to create individual interactive elements, according to one illustrative embodiment. FIG. 3 illustrates an illustrative method 300 for creating a portion of a wafer, from which interface elements such as interactive element 100 can be milled. More particularly, method 300 centers on the creation of a write pole portion of an interactive element having a bevel similar to the bevel 216 discussed above. It should be appreciated that once all of the layers of material have been applied to the wafer and any other processes performed on a wafer so that the wafer is completed, interactive elements are fabricated out of the wafer so that the air-bearing surface of the interactive element is a cross section of the various layers deposited onto the wafer, including the write pole.

Figure 4:
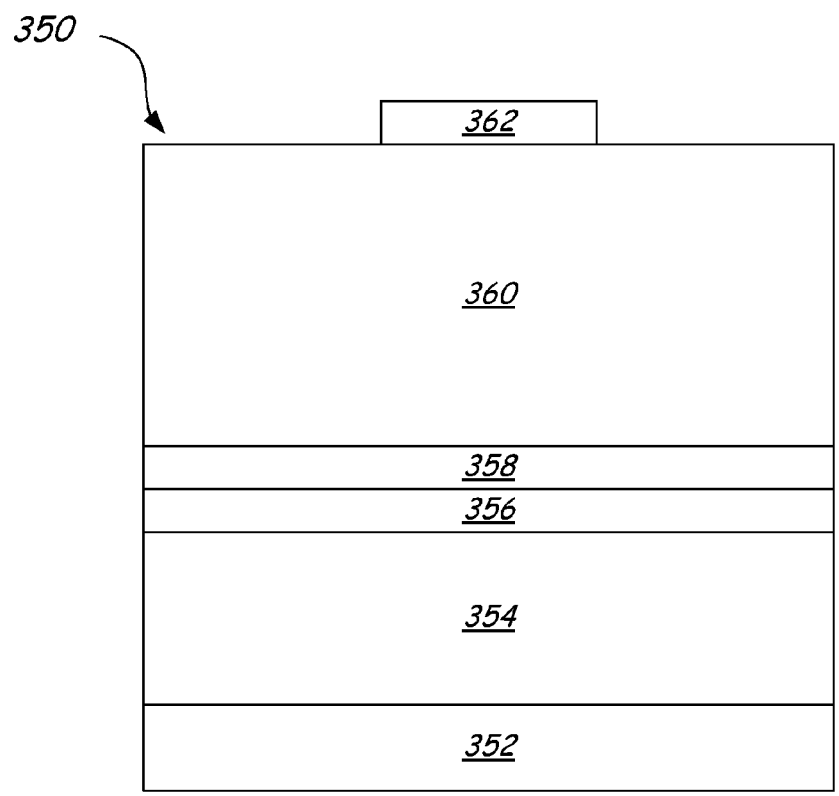
FIG. 4 is a side elevation schematic view several layers of material applied to a wafer for the purposes of manufacturing a write pole according to one illustrative embodiment.

At block 302, the method 300 includes depositing write pole material onto a substrate or base portion of a stack. The base portion can include various layers that have been previously applied to the substrate. FIGS. 4-14 illustrate various cross-sectional views of a portion of a wafer 350 at different stages of manufacture as described in the method 300. In FIG. 4, which is a cross sectional view of portions of several layers of material applied to the wafer 350, a substrate or base portion 352 is shown upon which a pole material 354 is deposited. The base portion 352 is illustratively a layer of alumina, although any suitable non-magnetic material may be used. It should be appreciated, of course, that in multi-layer stacks, the base portion 352 may include a number of layers previously applied to onto a substrate or it may be a first layer applied onto a substrate. The pole material 354 is deposited at a height of the top pole height plus the height of the bevel, which equals the overall height of the write pole and has a first surface (that corresponds to bottom surface 206 of FIG. 2) that is adjacent to base portion 352 and a second surface (that corresponds to top surface 204 of FIG. 2) that is opposite the first surface. The first surface and second surface are denoted by reference 206 and 204, respectively, in FIG. 5A, which is described further below.

Figure 4A:
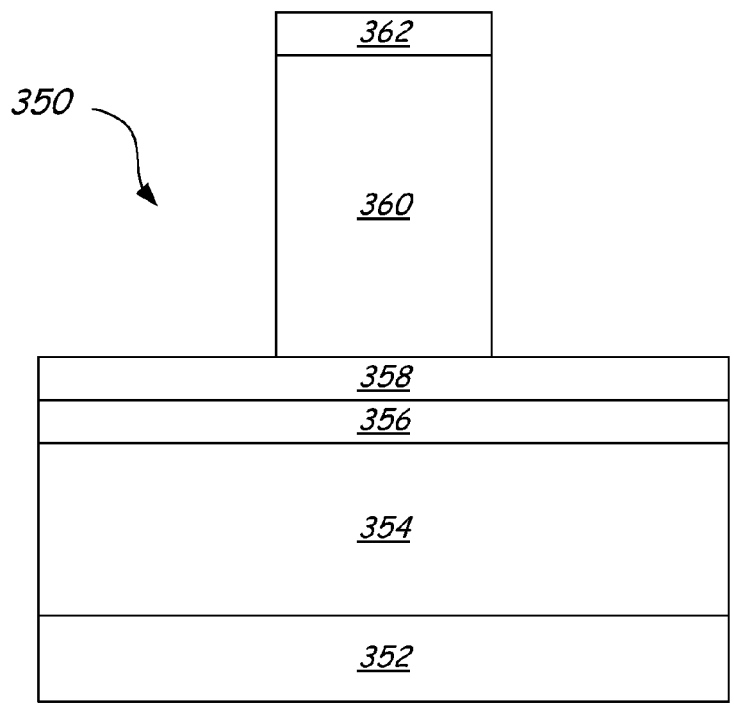
FIG. 4A is a side elevation schematic view of the several layers of material illustrated in FIG. 4 after a material removal process is performed to eliminate a portion of some of the layers.

After the pole material 354 is deposited onto the substrate 352, one or more masking layers are patterned onto the pole material 354. This is illustrated in block 304. Masking layers are applied to the pole material 354 to assist with controlling subsequent machining and/or etching processes, as described below. In one illustrative embodiment, layers 356, 358, 360 and 362 are applied to the pole material 354. Layer 356 is illustratively a layer of alumina applied directly onto the pole material 354. Layer 358 is illustratively a layer of chromium that is applied to the layer 356 using a photolithographic process. Layer 360 is formed from SiC and is applied to layer 358. Layer 362 is selectively selectively applied to layer 360 by employing a pattern masking process so that only a portion of the layer 360 is covered by layer 362. Once the layer 362 is patterned onto layer 360, an inductively coupled plasma etching process is illustratively employed to remove portions of layer 360. Since layers 358 and 362 are formed from chromium and since chromium is generally resistant to inductively coupled plasma etching after the etching process, layers 356, 358, 360, and 362 are generally shaped as illustrated in FIG. 4A after the etching process.

Figure 5:
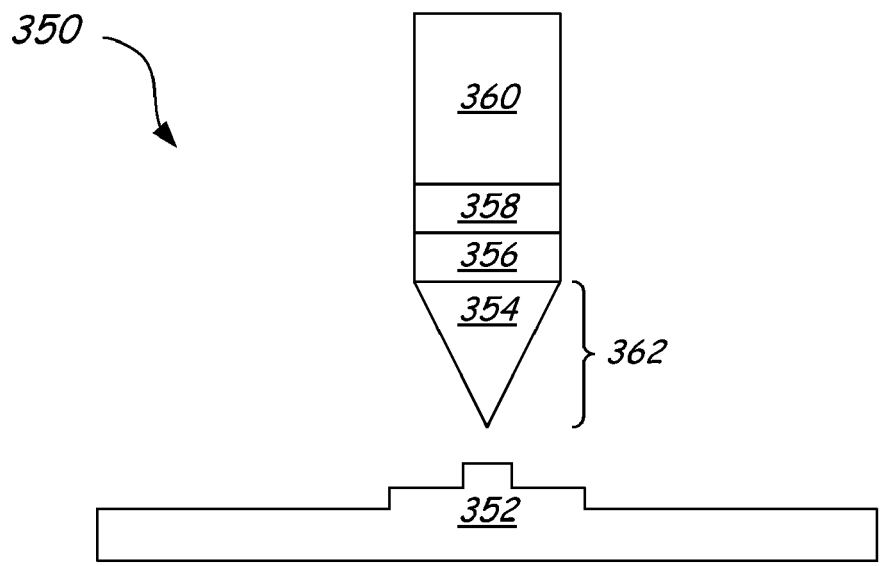
FIG. 5 is a cross sectional view of several layers of material applied to the wafer of FIG. 4 taken at what is an air-bearing surface of an interactive element at an intermediate stage during the manufacturing process of the interactive element.
Figure 6:
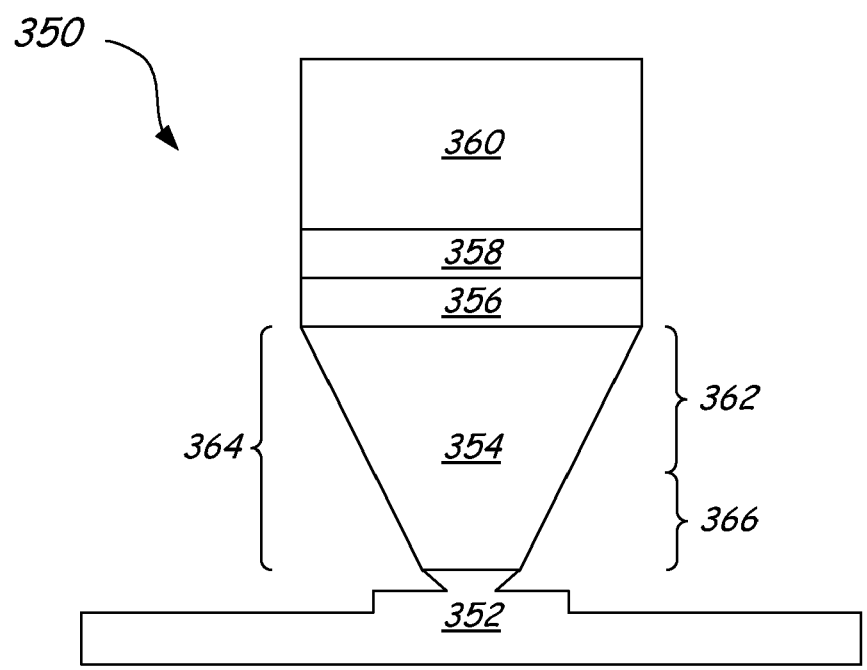
FIG. 6 is a cross sectional view of several layers of material applied to the wafer of FIG. 4 taken behind the air-bearing surface of the interactive element at an intermediate stage during the manufacturing process of the interactive element.
Figure 5A:
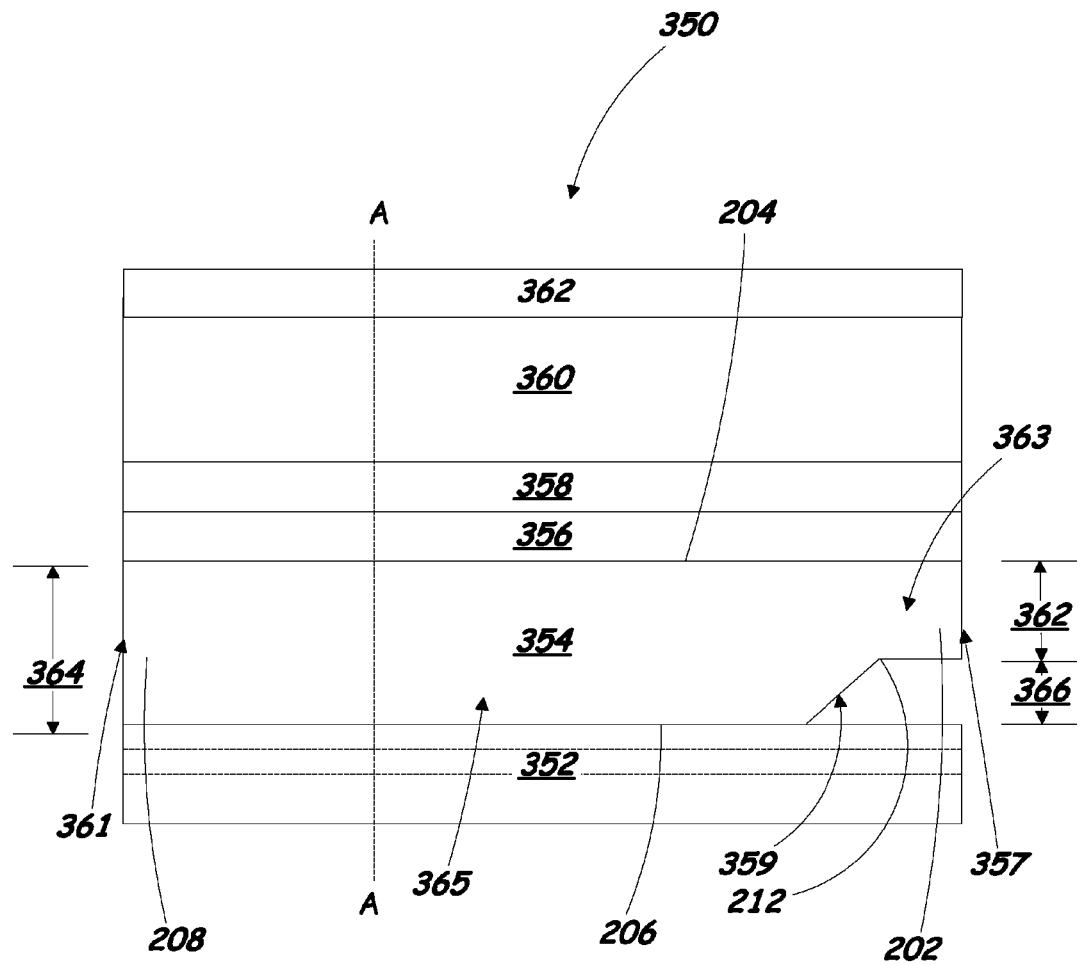
FIG. 5A illustrates a side elevation schematic view of multiple layers of a portion of a wafer, with the multiple layers including a layer of pole material shaped in a form similar to the write pole shown in FIG. 2.

Method 300 also includes a milling process that is illustratively performed on the wafer 350. This is illustrated at block 306 and FIGS. 5, 5A and 6. In one illustrative embodiment, the milling process is an ion milling process. During the milling process, material is removed from the wafer 350 until the layer of pole material 354 at the air-bearing surface is reduced to the top pole height 362 as is illustrated in FIG. 5 and is suspended from the base portion or substrate 352. It should be appreciated that FIG. 5 is an illustration of what eventually is the air-bearing surface of an interactive element such as interactive element 100. FIG. 5 does not illustrate any depth to the wafer 350—it merely illustrates the shape of the various layers shown at the air-bearing surface. FIG. 5A illustrates a side elevation schematic view of a portion of wafer 350 after the ion milling process. FIG. 5A shows pole layer 354 shaped in a form a write pole that is similar to write pole 200 of FIG. 2. Thus, layer 354, shown in FIG. 5A, has a proximal end 202 with a proximal surface 357 and a distal end 208 having a distal surface 361, which connects first surface 206 and second surface 204 of layer 354. As indicated above in the description of FIG. 5, during iron milling, material is removed from layer 354 to form a first portion 363 that is suspended from the base portion 352 at proximal end 202. A second portion 365 of layer 354, which includes distal end 208, is connected to first portion 363 of layer 354 via beveled portion 359 and is in contact with base portion 352 of the wafer. First portion 363 is at the top pole height or first height 362 from proximal surface 357 to break point 212 such that first portion 363 has a generally uniform shape. It should be noted that proximal surface 357 is a part of the air-bearing surface. FIG. 6 is another cross-sectional illustration of a portion of the wafer 350 taken at a surface (for example, along A-A in FIG. 5A) that shows the maximum height 364 of the layer of pole material 354 after the milling process illustrated in block 306 has been performed. As discussed above, the maximum height 364 of the layer 354 of pole material equals the top pole height 352 plus the maximum bevel height 366.

Figure 7:
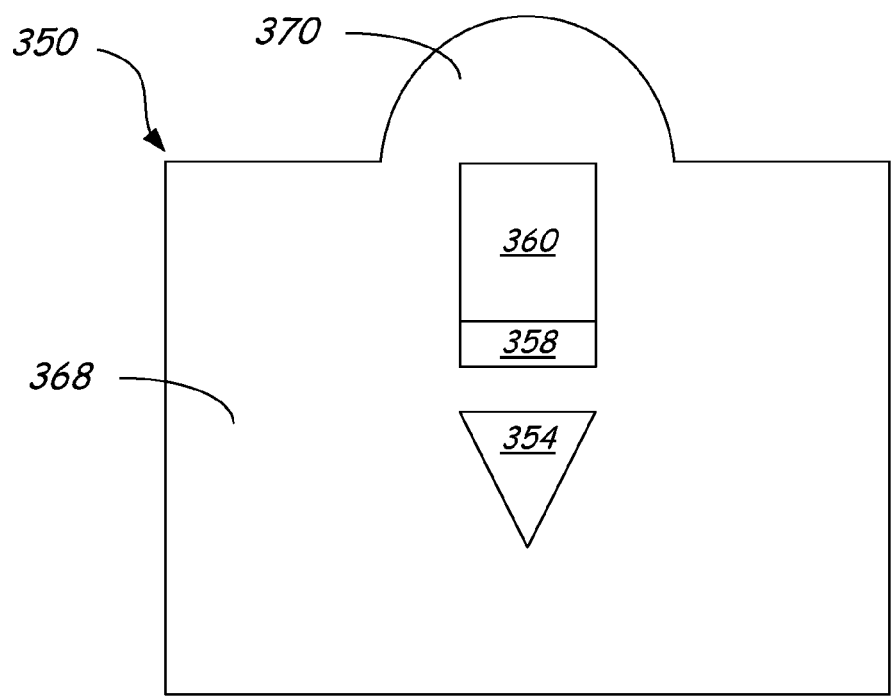
FIG. 7 is a cross sectional view of several layers illustrated in FIG. 5 after additional manufacturing procedures have been performed.
Figure 8:
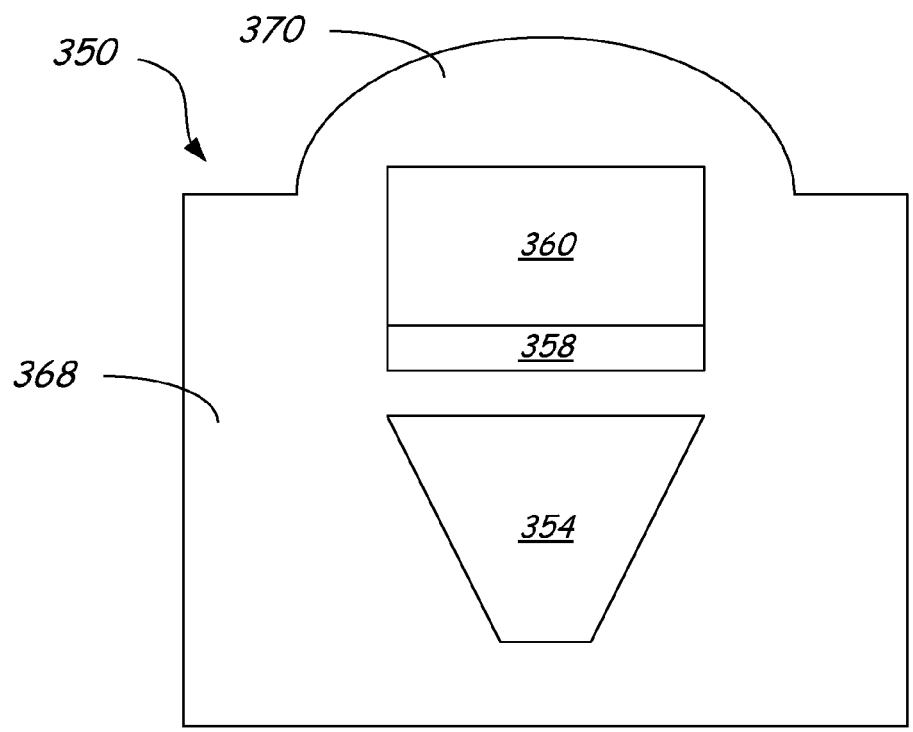
FIG. 8 is a cross sectional view of the several layers illustrated in FIG. 6 after additional manufacturing procedures have been performed.

After the milling process is completed, voids created by the previous etching and milling processes of the wafer 350 are illustratively filled with a non-magnetic material, which is applied to the wafer 350 as shown in block 308 and in FIGS. 7 and 8. In one illustrative embodiment, the same material that is used to form layers 352 and 356 is used to fill the voids. As discussed above, alumina is one material that may be used for such a purpose. FIG. 7, like FIG. 5, illustrates a cross sectional view of the wafer 350 taken at the air-bearing surface. Similarly, FIG. 8 is a cross sectional view of the wafer 350 taken in the same location as that of FIG. 6. As is illustrated in FIGS. 7 and 8, the pole material 354 is illustratively surrounded by non-magnetic material 368. In each of the figures, the newly applied non-magnetic material is shown to have joined with layers 352 and 356. Of course, it is to be appreciated that if the non-magnetic material 368 is not the same material as layers 352 and 356, these layers would be distinct from the non-magnetic material 368 that is applied as described in block 308. The non-magnetic material 368 is illustratively shown with a bulge 370 over that portion of the wafer where the layers 354, 358, and 360 are located.

Figure 9:
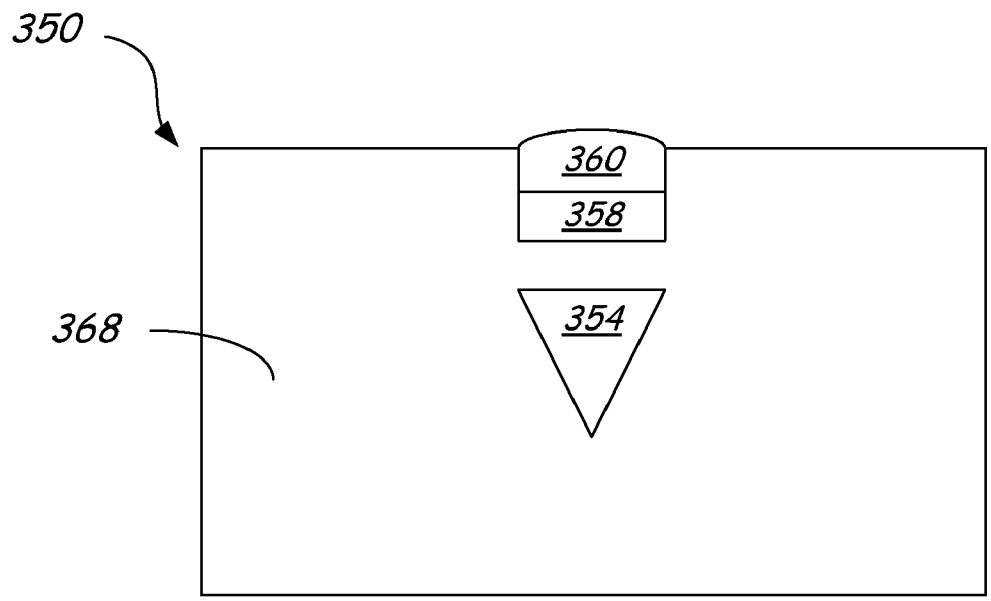
FIG. 9 is a cross sectional view of several layers illustrated in FIG. 7 after additional manufacturing procedures have been performed.
Figure 10:
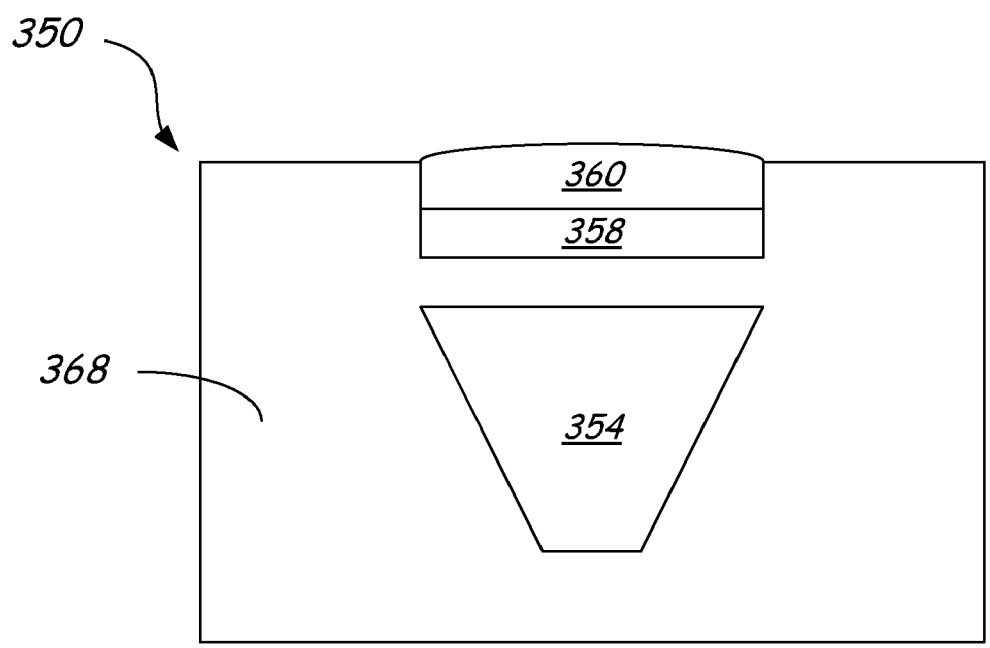
FIG. 10 is a cross sectional view of the several layers illustrated in FIG. 8 after additional manufacturing procedures have been performed.
Figure 11:
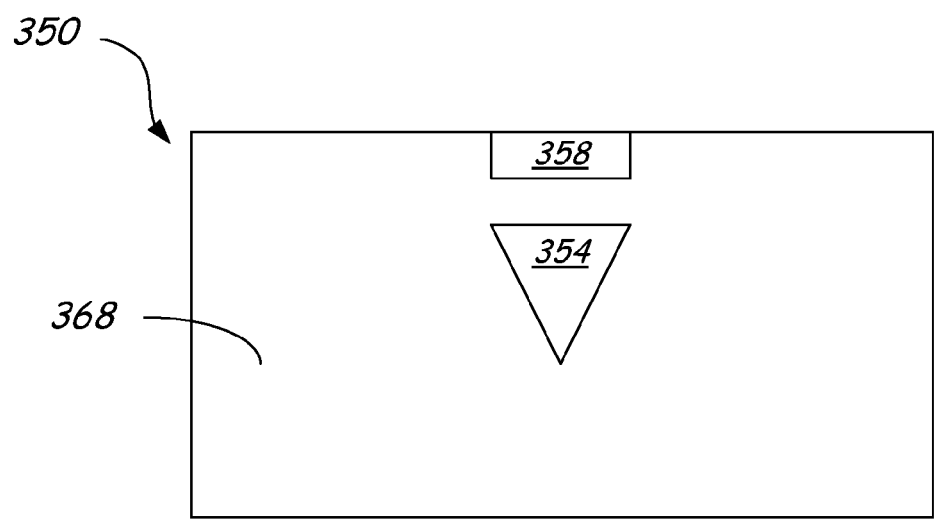
FIG. 11 is a cross sectional view of several layers illustrated in FIG. 9 after additional manufacturing procedures have been performed.
Figure 12:
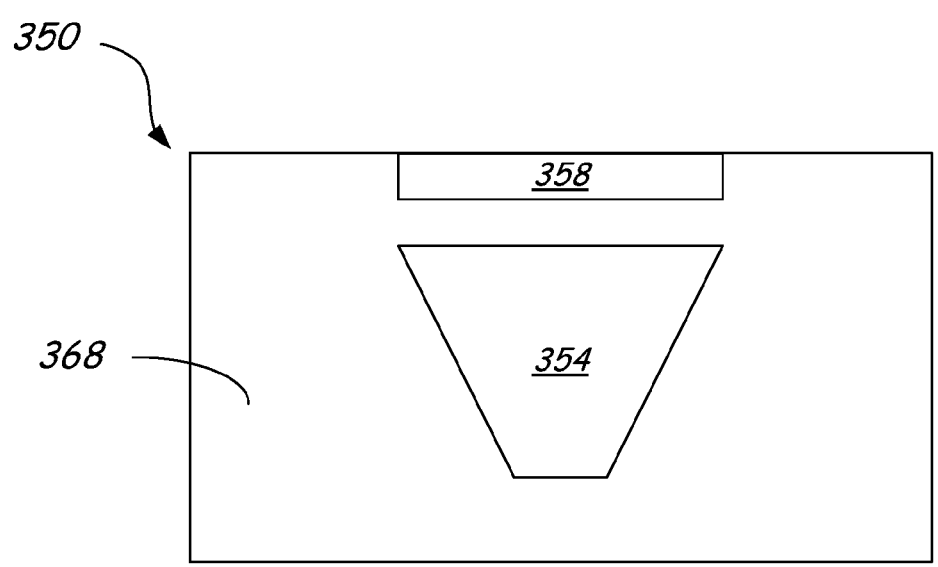
FIG. 12 is a cross sectional view of the several layers illustrated in FIG. 10 after additional manufacturing procedures have been performed.
Figure 13:
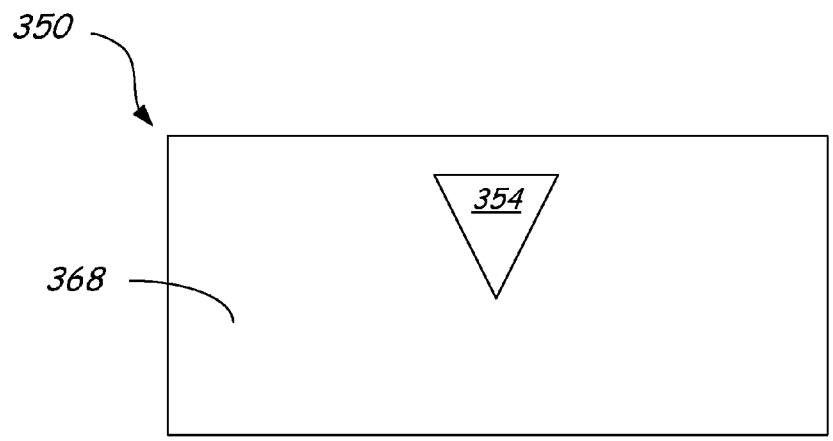
FIG. 13 is a cross sectional view of several layers illustrated in FIG. 11 after additional manufacturing procedures have been performed.
Figure 14:
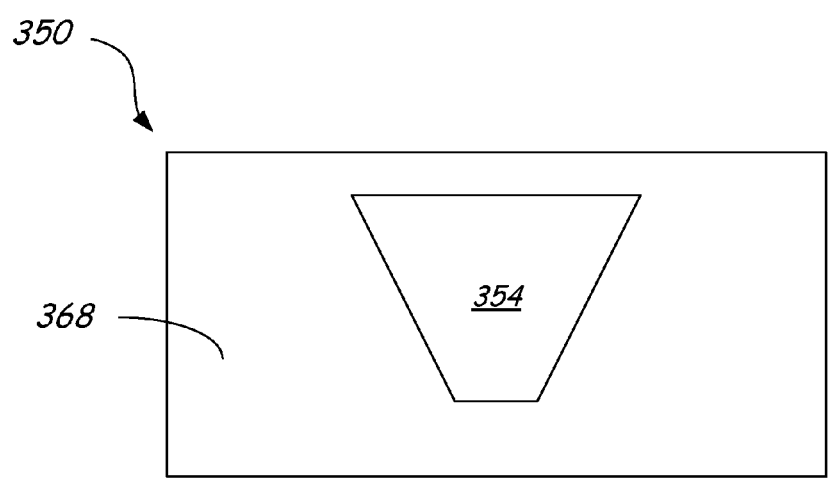
FIG. 14 is a cross sectional view of the several layers illustrated in FIG. 12 after additional manufacturing procedures have been performed.

After depositing the non-magnetic material onto the wafer 350, the method 300 further includes removing masking layers of material, as is illustrated in block 310. In one illustrative embodiment, a first masking layer removal process includes a chemical mechanical polishing (CMP) process. During the CMP process, portions of the non-magnetic material 368, including the bulge 370, are removed from the wafer 350 until the masking layer 360. The layer 360 is made of SiC, as is discussed above, which is resistant to the CMP process. FIGS. 9 and 10 illustrate a portion of the wafer 350 at the air-bearing surface and below the air-bearing surface, respectively, after the CMP process has been performed. The process illustrated in block 310 also includes, in one embodiment, a process of inductively coupled plasma (ICP) etching to remove masking layer 360, as shown in FIGS. 11 and 12, which, like FIGS. 9 and 10, illustrate a portion of the wafer at the air-bearing surface and below the air-bearing surface, respectively. The process illustrated in block 310 further illustratively includes, in one embodiment, milling layer 358 using an ion milling process. After removing the layer 358 (as shown in FIGS. 13 and 14), the wafer 350 is left with write pole material 354 that is surrounded by non-magnetic material 368. Further processes to create the wafer 350 can then be performed as are advantageous.

Returning again to FIG. 2, the bevel 216 is self-aligned with respect to the rest of the write pole 200 via the method 300 discussed above. The precise positioning of the bevel 216, achieved in the method 300 along with its conformance to the overall shape of the write pole 200 enables a bevel 216 to have a relatively large height, which, in turn, serves to provide improved magnetic field enhancement, even in designs with increasingly dense storage media. Further, when the write pole 200 has a sufficient height the write pole 200 no longer needs a yoke. Conventional yoke design with a straight wall profile requires that the yoke be positioned further behind the air-bearing surface 202 to prevent inadvertent side track erasure, resulting in reduced write-ability because of a reduced magnetic field. The slope of the bevel 216, however, allows the bevel 216 to be positioned very close behind the air-bearing surface while at the same time allowing the magnetic field to be focused within the top pole height 210 at the air-bearing surface. This produces an increased magnetic field within the area in front of the proximal end 202 of the write pole 200, which improves high data performance and writability on storage media with high areal densities. In addition, eliminating the yoke reduces complexity in the manufacturing process.

Figure 15:
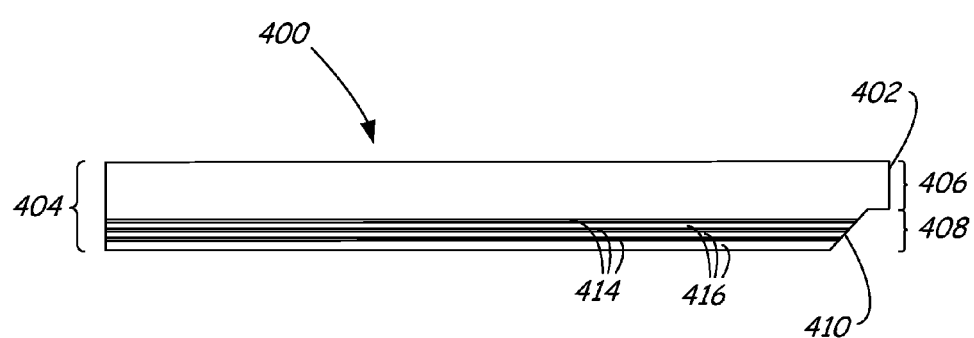
FIG. 15 illustrates a side view of a write pole of an interactive element of the type having a beveled side according to another illustrative embodiment.

FIG. 15 is an illustration of a side view of a write pole 400 according to another illustrative embodiment. Write pole 400 has an air-bearing surface 402 and height 404 that equals the top pole height 406 plus the height 408 of a bevel 410. The bevel 410 includes a plurality of layers 414 of non-magnetic materials that alternate between layers 416 of pole material. By including the layers 414 of non-magnetic materials, it is possible to more effectively focus the magnetic field provided by the write pole 400 and reduce eddy current effects. Because the pole material of write pole 400 is applied by sputtering as opposed to electroplating, it is possible to precisely apply layers 414 of non-magnetic materials.

One method embodiment includes depositing a layer of pole material onto a base portion of a wafer, with a first surface of the layer being adjacent to the base portion. The method also includes depositing a pattern of masking material onto a portion of a second surface of the layer. The method further includes removing material from the layer of pole material unprotected by the pattern of masking material, including a portion from the first surface, to cause a portion of the layer of pole material to be suspended from the base portion.

In one embodiment, removing material from the layer of pole material includes performing an ion milling process. In a particular embodiment, depositing a pattern of masking material can include depositing more than one layer of masking material. Also, in certain embodiments, removing material from the layer of pole material can include removing material directly beneath the pattern of masking material so that edges between the first and second surfaces are tapered from the second surface to the first surface.

In some embodiments, removing material from the layer of pole material includes removing material so that the first portion extends at the first height from a first end of the layer to a break point. The first height is measured from the second surface to an opposing surface. In such embodiments, removing material from the layer of pole material further includes removing material so that the first section has a generally uniform shape from the first end to the break point. In some embodiments, removing material from the layer of pole material further includes removing material so that the layer has a bevel portion with a generally increasing height from the break point to a second portion of the layer. In certain embodiments, removing material from the layer of pole material further includes removing material directly beneath the pattern of masking material so that edges between the first and second surfaces are tapered from the second surface to the first surface so that an angle of taper generally decreases from the break point to the second portion.

Some embodiments can include depositing a layer of electrically isolated material onto the layer of pole material after removing material from the layer of pole material so that a portion of the layer of electrically isolated material is positioned between the layer of pole material and the base portion.

In certain embodiments, depositing pole material onto the base portion includes depositing a first layer of conductive material onto the base portion, depositing a layer of non-magnetic material onto the first layer of conductive material, and depositing a second layer of conductive material onto the layer of non-magnetic material. Depositing pole material onto the base portion can further include depositing a second layer of non-magnetic materials onto the second layer of conductive material, and depositing a third layer of conductive material onto the layer of non-magnetic material.

Another method embodiment includes applying an electrically conductive layer of material onto a base portion of a wafer, and removing a portion of the electrically conductive layer directly adjacent to the base portion so that a portion of the electrically conductive layer is suspended above the base portion. The method can further include applying a masking material to cover a portion of the electrically conductive material previously applied to the base portion.

In one embodiment, removing a portion of the electrically conductive layer includes removing material not covered by the masking material. In certain embodiments, removing a portion of the electrically conductive layer can include removing some of the material previously covered by the masking material.

In one embodiment, removing a portion of the electrically conductive layer includes removing material so that a first portion extends at a first height from a first end of the electrically conductive layer to a break point and has a generally increasing height over a second portion that extends from the break point.

The embodiments discussed above provide several advantages. For example, the embodiments enhance the magnetic field provided by the interactive element, reduce the transition curvature by enhancing the field at the corner of the poles, and reduce adjacent track interference, by focusing the magnetic field over the track with which the element interacts. All of these advantages lead to improved areal density capability It is to be understood that even though numerous characteristics and advantages of the various embodiments have been set forth in the foregoing description, together with details of the structure and function of various embodiments, this disclosure is illustrative only, and changes may be made in detail, especially in matters of structure and arrangement of parts within the principles of the present embodiments to the full extent indicated by the broad general meaning of the terms in which the appended claims are expressed.

What is claimed is:

1. A method, comprising:
depositing a layer of pole material onto a base portion of a wafer, the layer of pole material having a first surface adjacent to the base portion and a second surface opposite the first surface;
depositing a pattern of masking material onto a portion of the second surface of the layer; and
removing material from the layer of pole material, including the pole material unprotected by the pattern of masking material, to form a pole comprising:
a proximal end having a proximal surface and a distal end having a distal surface that is opposite the proximal surface, the distal surface connects the first surface and the second surface;
a first portion, at the proximal end, that is suspended from the base portion of the wafer; and
a second portion that includes the distal end, the second portion is connected to the first portion and the second portion is in contact with the base portion of the wafer.

2. The method of claim 1, wherein removing the material from the layer of pole material includes performing an ion milling process.

3. The method of claim 1, wherein depositing a pattern of the masking material includes depositing more than one layer of masking material.

4. The method of claim 1, wherein removing the material from the layer of pole material includes removing the material directly beneath the pattern of masking material so that edges between the first and second surfaces are tapered from the second surface to the first surface.

5. The method of claim 1, wherein removing the material from the layer of pole material includes removing the material so that the first portion extends, at a first height, from the proximal surface to a break point.

6. The method of claim 5, wherein removing the material from the layer of pole material further includes removing the material so that the first portion has a generally uniform shape from the first end to the break point.

7. The method of claim 5, wherein removing the material from the layer of pole material further includes removing the material so that the pole has a bevel portion with a generally increasing height from the break point to the second portion of the pole.

8. The method of claim 7, wherein removing the material from the layer of pole material further includes removing the material directly beneath the pattern of masking material so that edges between the first and second surfaces are tapered from the second surface to the first surface so that an angle of taper generally decreases from the break point to the second portion.

9. The method of claim 1, and further comprising:
depositing a layer of non-magnetic material onto the layer of pole material after removing the material from the layer of pole material so that a portion of the layer of non-magnetic material is positioned between the pole and the base portion.

10. The method of claim 1, wherein the layer of pole material comprises multiple layers with at least one of the multiple layers comprising non-magnetic material.

11. A method, comprising:

applying a layer of pole material onto a base portion of a wafer; and removing a portion of the layer of pole material directly adjacent to the base portion to form a first portion of the layer of pole material that is suspended from the base portion, wherein a second portion of the layer of pole material is connected to the first portion of the layer of pole material and the second portion of the layer of pole material is in contact with the base portion of the wafer.

* * * * *